United States Patent
Hayden et al.

(10) Patent No.: US 7,529,816 B2
(45) Date of Patent: May 5, 2009

(54) SYSTEM FOR PROVIDING MULTI-PATH INPUT/OUTPUT IN A CLUSTERED DATA STORAGE NETWORK

(75) Inventors: Mark G. Hayden, Fairfield, CA (US); Sebastian Sobolewski, Broomfield, CO (US); Robert N. Mastors, Erie, CO (US); John Spiers, Louisville, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 375 days.

(21) Appl. No.: 10/908,993

(22) Filed: Jun. 3, 2005

(65) Prior Publication Data

US 2006/0277383 A1 Dec. 7, 2006

(51) Int. Cl.
*G06F 15/177* (2006.01)
(52) U.S. Cl. .................................................. 709/220
(58) Field of Classification Search ......... 709/220–223; 710/38
See application file for complete search history.

(56) References Cited

U.S. PATENT DOCUMENTS

| | | | |
|---|---|---|---|
| 5,170,470 A | 12/1992 | Pindar et al. ............... 395/275 |
| 5,832,492 A | 11/1998 | Wooten ...................... 707/101 |
| 6,003,088 A | 12/1999 | Houston et al. ............. 709/230 |
| 6,092,116 A | 7/2000 | Earnest et al. .............. 709/236 |
| 6,321,350 B1 | 11/2001 | Baskey et al. ............... 714/704 |
| 6,574,667 B1 | 6/2003 | Blumenau et al. .......... 709/229 |
| 6,732,166 B1 | 5/2004 | Woodruff ................... 709/221 |
| 6,782,389 B1 | 8/2004 | Chrin et al. | |
| 6,816,927 B2 | 11/2004 | Bouchet ...................... 710/38 |
| 6,820,172 B2 | 11/2004 | Nielsen et al. .............. 711/114 |
| 2003/0217212 A1 | 11/2003 | Kim ........................... 710/305 |
| 2004/0078632 A1 | 4/2004 | Infante et al. ................... 714/5 |
| 2004/0107300 A1 | 6/2004 | Padmanabhan et al. ........ 710/1 |
| 2005/0060330 A1* | 3/2005 | Sonoda et al. ............. 707/100 |
| 2006/0277383 A1* | 12/2006 | Hayden et al. ............. 711/170 |

OTHER PUBLICATIONS

Microsoft Corp., "Highly Available Storage: Multipathing and the Microsoft MPIO Driver Architecture," White Paper published Oct. 2003, web pages located at http://download.microsoft.com/download/3/0/4/304083f1-11e7-44d9-92b9-2f3cdbf01048/mpio.doc.
Microsoft Corp., "Microsoft Delivers Multipath I/O Support for Storage Devices; Move Further Positions Windows as a Core Platform for Enterprise Storage," Sep. 5, 2002, web pages located at http://www.Microsoft.com/presspass/press/2002/sep02/09-05MultiPathIOPR.asp.

* cited by examiner

*Primary Examiner*—Salad Abdullahi

(57) ABSTRACT

A distributed network storage system provides capability to send and receive storage information from multiple network storage servers in a storage area network using iSCSI commands. A storage server system comprising at least two data storage servers stores one or more logical volumes of data. A host computer receives a storage command from a host application, and determines one or more data storage servers has information to complete the storage command. The host computer generates one or more iSCSI network commands to carry out the storage command, and transmits the iSCSI network commands directly to each data storage server having necessary information. The storage servers receive iSCSI network commands, and return a response to the host. The host and storage servers verify the configuration of the storage network and are capable of correcting or updating the configuration as required.

6 Claims, 8 Drawing Sheets

SYSTEM FOR PROVIDING MULTI-PATH INPUT/OUTPUT IN A CLUSTERED DATA STORAGE NETWORK

FIELD OF THE INVENTION

The present invention relates to network data storage, and, more specifically, to multi-path input/output between data storage servers and hosts connected to a data storage network.

BACKGROUND OF THE INVENTION

Storage area networks, also referred to as SANs, are dedicated networks that connect one or more systems, referred to as hosts or storage clients, to storage devices and storage subsystems. Data storage on a SAN may be accomplished using a number of individual storage devices or subsystems that each store one or more volumes of data. Furthermore, data storage may also be accomplished using what is known as logical volumes in a distributed network data storage system, in which there are two or more network data storage devices utilized and a mechanism exists for defining the logical volume that physically extends over the two or more network data storage devices. In such a distributed storage system, the hosts perform storage operations on the logical volume that, from the perspective of the hosts, appears to be a single storage device. For example, a network computer system employing distributed network storage may be comprised of: (a) two network storage servers; (b) a computer; and (c) a network for facilitating data transfers between the servers and the computer. The computer comprises a driver (a program that allows an operating system to communicate with a device) for each of the network storage devices and a logical volume manager that controls the drivers so as to define a logical or virtual volume that extends over the two network storage servers.

Such SANs are commonly used for data storage where the data is required to be highly available. Such high availability is necessary because often the customers storing the data on the SAN need immediate access to the data, and any unavailability may result in lost time, lost revenue, and/or dissatisfied customers. In order to provide high availability, such SANs commonly employ multiple failure recovery and backup systems, including storing data in a redundant fashion and providing backup storage devices, among others. Another key characteristic of such data storage systems is the time required to complete storage operations. In order to provide relatively fast storage operations, such systems commonly employ high bandwidth network connections and a high bandwidth network. For example, fibre channel is presently one of the leading technologies for SANs. Furthermore, host computers may issue storage I/O commands to multiple storage devices in parallel in order to provide increased performance, with each storage device returning a portion of required data that may then be assembled by the host computer.

SUMMARY OF THE INVENTION

The present invention has recognized that a significant amount of resources may be consumed for storage operations in a distributed network storage topology that requires a host to maintain specific data locality. The present invention increases performance in such a system by providing capability for multiple parallel paths to read/write data from/to data volumes spanning storage servers in a distributed storage system.

In one embodiment, the present invention provides a network storage system, comprising: (a) a storage server system comprising at least two data storage servers that each comprise: (i) a network interface operable to transmit/receive communications to/from a network infrastructure; (ii) at least one data storage device; and (iii) a processor operable to receive, from the network interface, an iSCSI network command and generate, to carry out the iSCSI command, one or more device specific commands for the data storage device; and (b) a host computer comprising: (i) a host network interface operable to transmit/receive communications to/from the network infrastructure; and (ii) a host processor operable to receive a storage command from a host application, determine one or more of the data storage servers has information to complete the storage command; generate one or more iSCSI network commands to carry out the storage command, and transmit the iSCSI network commands to each of the data storage servers, wherein each of the iSCSI network commands is transmitted over the network infrastructure to the one or more data storage servers having the information.

In an embodiment, each of the data storage servers includes a data storage configuration identifier indicative of an allocation of data storage within the storage server system at a point in time. The host computer is further operable to provide a first value for the data storage configuration identifier to the data storage servers; and the data storage servers are further operable to compare the first value with the data storage configuration identifier and generate an error code when the first value does not match the data storage configuration identifier. The host computer, in an embodiment, generates an iSCSI mode sense command to retrieve configuration information from the data storage servers. The iSCSI commands may also include read commands to read simultaneously from at least two data storage servers.

In another embodiment, the host computer further comprises a Microsoft Windows Multipath I/O device specific module that is operable to generate the iSCSI commands. The device specific module may add iSCSI sessions to new iSCSI targets and remove iSCSI sessions for iSCSI targets no longer connected to the network infrastructure. The host computer is also operable, in an embodiment, to update data location information in a manner that protects against unsynchronized access that could cause data corruption.

In another embodiment, the present invention provides a data storage server system, comprising: (a) at least a first and a second data storage server; (b) at least one virtual volume of data storage distributed over at least the first and second data storage servers; and (c) a network infrastructure. Each of said data storage servers, in this embodiment, comprise: (a) a configuration map comprising information related to the virtual volume and portions of the virtual volume stored at each of the data storage servers; (b) a network interface operable to transmit/receive communications to/from the network infrastructure; (c) at least one data storage device; and (d) a processor operable to receive, from the network interface, a network command indicating a change in the configuration map and generate an error code when additional iSCSI commands are received requesting data storage operations before a new configuration map is received. The processor is also operable to receive an iSCSI network command and generate, to carry out the iSCSI network command, one or more device specific commands for the data storage device without communicating with any other data storage server when an indication of a change in the configuration map has not been received.

The data storage servers may include a data storage configuration identifier indicative of an allocation of data storage within the storage server system at a point in time. The data storage servers may compare a first value indicative of data storage allocation received with the iSCSI network command with the data storage configuration identifier and generate an error code when the first value does not match said data storage configuration identifier. Such an error code may comprise, for example, an iSCSI status comprising a SCSI sense key comprising a predetermined code. The data storage servers may further determine if the iSCSI command includes a mode sense command and generate an iSCSI mode sense page indicating a current data configuration identifier of the data storage server. The data storage servers, an another embodiment, are further operable to forward read and write commands to an appropriate other data storage server when the iSCSI command incorrectly requests data from the other data storage server.

In a further embodiment, the present invention provides a host storage computer, comprising: (a) a network interface operable to transmit/receive communications to/from a network infrastructure; and (b) a host processor capable to: (i) receive a storage command from a host application operating using the host processor, (ii) determine one or more data storage servers having information to complete the storage command; (iii) generate one or more iSCSI network commands to carry out the storage command, and (iv) transmit the iSCSI network commands to each of the data storage servers, wherein each of the iSCSI network commands is transmitted over the network infrastructure to the one or more data storage servers having the information. The host processor, in an embodiment, generates an iSCSI mode sense command to retrieve configuration information from the data storage servers. The iSCSI commands may include read commands to read simultaneously from at least two data storage servers. In an embodiment, the host storage computer includes a Microsoft Windows Multipath I/O device specific module that is operable to generate the iSCSI commands. The device specific module may be further operable to add iSCSI sessions to new iSCSI targets and remove iSCSI sessions for iSCSI targets no longer connected to the network infrastructure. The host processor, in an embodiment, is further operable to update data location information in a manner that protects against unsynchronized access that could cause data corruption.

DETAILED DESCRIPTION

When operating a SAN with several network storage devices in parallel on the network, a host computer must maintain configuration information related to which network storage device contains data related to an I/O storage request. Furthermore, many network topologies require that the host have a specific network address for storage operations. For example, Internet Engineering Task Force (IETF) Standard RFC 3720 Internet Small Computer Systems Interface (referred to as "iSCSI") requires a specific network address for commands from an initiator to a target. In such network topologies, device drivers executing on a host computer may perform device discovery at host boot-up to determine network connected devices and the associated network address. The discovered devices are configured to be accessible to applications running on the host by creating a node for each device within the host. These types of nodes are referred to as operating system device nodes. Each node functions as an internal (to the host) representation of an attached device and provides a communication path to the device. Such a SAN topology may also provide the ability for network storage devices to be able to communicate with other network storage devices independently of the host. In some cases, discovering network devices and associated paths available to the host computer as part of the boot-up process may not be feasible because of the number of devices capable of being attached to the network, and the devices may change dynamically following boot-up. Furthermore, there may be multiple paths from a host computer to a particular device in the network. The complexity of the host application thus increases as the number of network connections increases, and the number of potential paths to a particular network device increases. In addition, when one or more storage volumes are distributed volumes spanning two or more network storage devices, the host application views the distributed volumes as a single logical entity. In such systems, data input/output (I/O) operations to different network storage devices that are viewed as a single logical entity have traditionally been forwarded to a single network storage device, with that device then forwarding portions of the storage operation to other network storage devices over any available path. The present invention recognizes that network latency may be decreased by allowing I/O to proceed directly to the network storage device that contains the data, rather than through another network storage device. Furthermore, directly accessing the appropriate network storage device prevents performance of I/O operations to the SAN from being limited to the one network storage device that is directing all the I/O.

Figure 1:
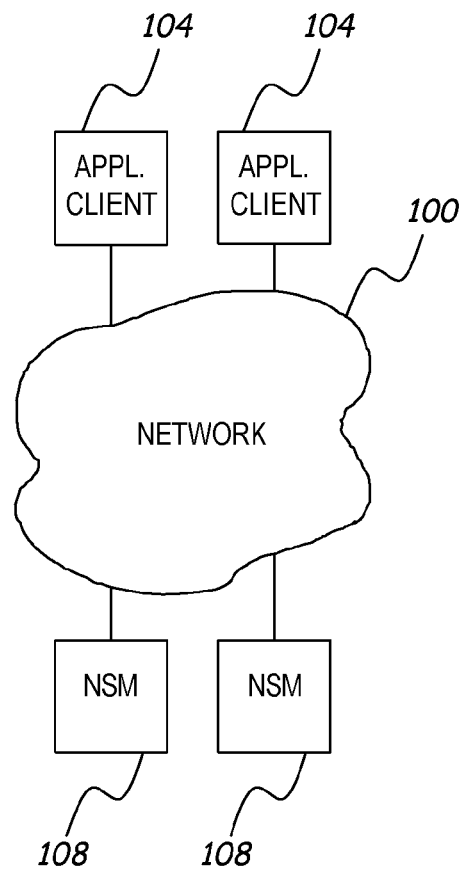
FIG. 1 is a block diagram illustration of a network storage system of an embodiment of the present invention.

Referring to FIG. 1, a block diagram illustration of a computing network and associated devices of an embodiment of the present invention is described. In this embodiment, a network 100 has various connections to application clients 104, also referred to as hosts or host computers, and network storage module (NSM) devices 108 also referred to as storage servers. The network 100, as will be understood, may be any computing network utilized for communications between attached network devices, and may include, for example, a distributed network, a local area network, and a wide area network, to name but a few. In one embodiment, the network 100 is an Ethernet network, although any other type of network may be used. The application clients 104 may be any of a number of computing applications connected to the network, and may include, for example, a database application, an email server application, an enterprise resource planning application, a personal computer, and a network server application, to name but a few. The NSM devices 108 are utilized in this embodiment for storage of data provided by the application clients 104. Such network storage is utilized to store data from one application, and make the data available to the same application, or another application on the same or a different application client 104. Furthermore, the NSM devices 108 may provide a relatively large amount of data storage, and also provide data storage that may be backed up, mirrored, or otherwise secured such that loss of data is unlikely. Utilizing such NSM devices 108 can reduce the requirements of individual applications requiring such measures to prevent data loss, and by storing data at one or more NSM devices 108, data may be securely retained with a reduced cost for the application clients 104. Furthermore, such NSM devices 108 may provide increased performance relative to, for example, local storage of data. This improved performance may result from relatively high speed at which the NSM devices 108 may store data.

The NSM devices 108, in an embodiment, store distributed virtual volumes of data that may be viewed by an application of a host computer as a single volume of data located at a single storage device. The NSM devices 108 may be configured in clusters, with each cluster having one or more logical volumes (or LUNs). One or more management servers may also be configured in the network that provide management functions over one or more clusters associated with each management server. Furthermore, logical volumes, clusters, management servers, and host computers and applications may be added and removed from the network as various instances in time, with minimal to no interruption in data storage functions for hosts and applications on the network.

A key performance measurement of storage systems is the rate at which an application running on an application client 104 may write data to the NSM devices 108 and the rate at which data may be read from the NSM devices 108. A number of factors may influence this performance measurement, including the network bandwidth, and the rate at which the storage devices within the NSM 108 may store and retrieve data. Furthermore, an application running on an application client 104 generally requests that data be written or read to the NSM devices 108 through a software program that is also running on the application client 104. Such a software program, as will be described in more detail below, generally allows the application to view data as being stored on a single device, when the data may actually be stored across multiple devices. The overhead associated with the storage software may also have an impact on the performance of the storage system.

Figure 2:
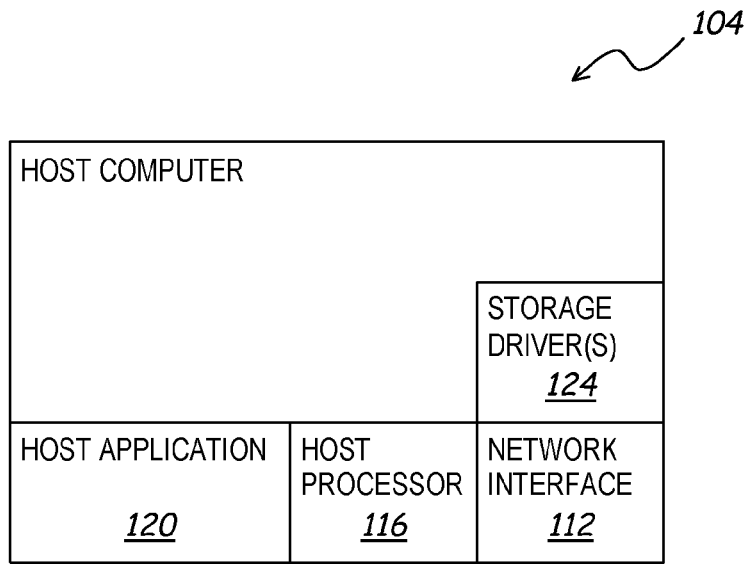
FIG. 2 is a block diagram illustration of a host computer of an embodiment of the invention.

Referring now to FIG. 2, a block diagram illustration of a host computer 104 of an embodiment, of the present invention is now described. The host computer 104 (or application client) in this embodiment includes a network interface 112, a host processor 116, and one or more host applications 120. The network interface 112 may provide any appropriate physical connection to the network, including optical fiber, coaxial cable, and twisted pair, to name but a few. In this embodiment, the network 100 is an Ethernet network and the network interface 112 provides an iSCSI network interface and is operable to communicate over the network 100 (FIG. 1) using iSCSI protocol with the NSM devices 108 (or storage servers). As mentioned above, iSCSI is Internet SCSI (Small Computer System Interface), an Internet Protocol (IP)-based storage networking standard for linking data storage facilities. By carrying SCSI commands over IP networks, iSCSI is used to facilitate data transfers over intranets and to manage storage over long distances, and is commonly utilized in SANs. The iSCSI protocol can be used to transmit data over local area networks (LANs), wide area networks (WANs), or the Internet and can enable location-independent data storage and retrieval. A device that generates and sends an iSCSI command is commonly referred to as an initiator, and the device to which the command is directed is commonly referred to as a target.

In this embodiment, when the host application 120 sends a storage request, the host processor 116 generates the appropriate iSCSI commands and data request, which then go through encapsulation. In the embodiment of FIG. 2, the host computer 104 includes one or more storage drivers 124 that are used by the host processor 116 to perform this task. In this embodiment, the storage drivers 124 include a iSCSI controller. One or more encryption procedures may also be applied, if desired. A packet header is added before the resulting IP packets are transmitted to the network interface 112, which in one embodiment is an Ethernet connection. When a packet is received at the network interface 112, it is decrypted (if it was encrypted before transmission), and disassembled, separating the iSCSI commands and request.

Figure 3:
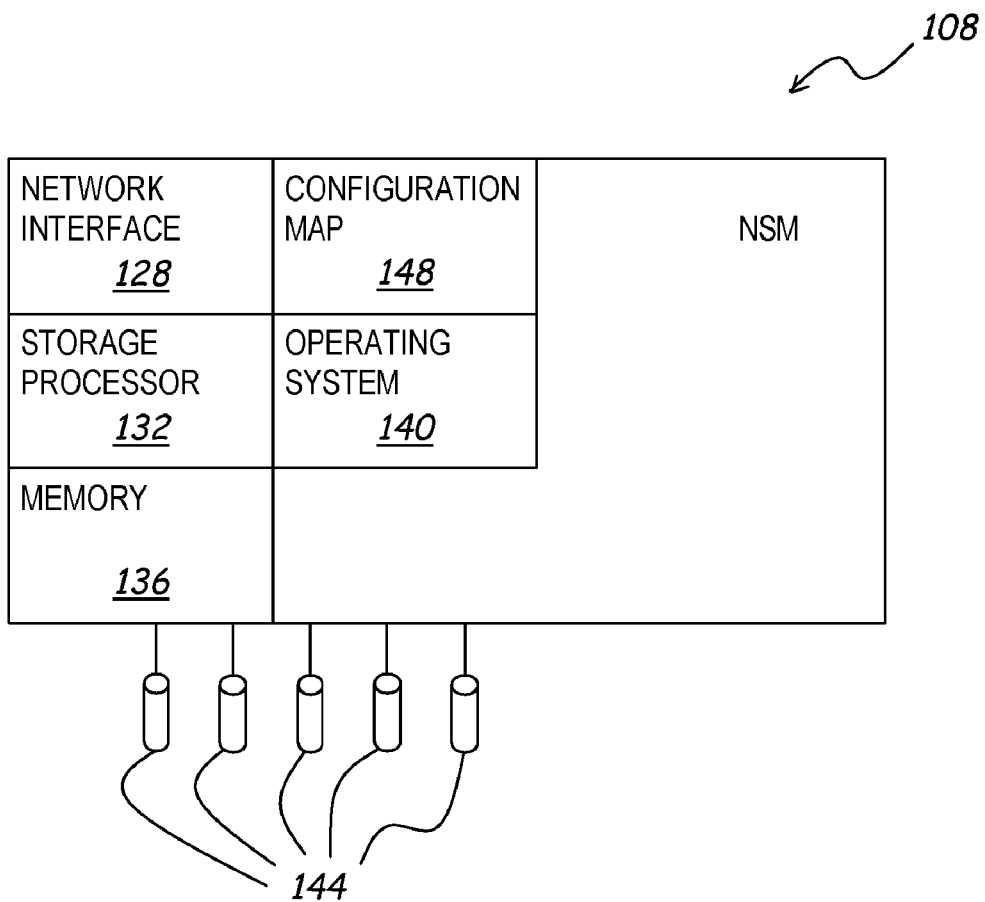
FIG. 3 is a block diagram illustration of a network storage module of an embodiment of the invention.

Referring now to FIG. 3, a block diagram illustration of a NSM device 108 (or storage server) of an embodiment of the invention is now described. In this embodiment, the NSM 108 includes a network interface 128, which provides an appropriate physical connection to the network and operates as an interface between the network 100 (FIG. 1) and the NSM device 108. As mentioned above, a host computer 104 communicates with the NSM device 108 using iSCSI commands, and thus the network interface 128 for the NSM device 108 is operable to receive iSCSI commands and send iSCSI communications to iSCSI targets in response to the received commands. The network interface 128 may provide any available physical connection to the network 100, including optical fiber, coaxial cable, and twisted pair, to name but a few.

The network interface 128 may also operate to send and receive data over the network 100 using any of a number of other transmission protocols, such as, for example, Fibre Channel. The NSM 108 includes a storage processor 132, with an associated memory 136. The storage processor 132 provides processing for an operating system 140 that controls operations for the NSM device 108, including the communications over the network interface 128. The operating system 140, in this embodiment, also controls the operations for the storage and retrieval of data stored at data storage components 144 of the NSM device 108. The NSM device 108 includes one or more data storage components 144, which are utilized to store data. In one embodiment, the storage components 144 include a number of hard disk drives. It will be understood that the storage components 144 could be any type of data storage device, including storage devices that store data on storage media, such as magnetic media and optical media. The storage devices may also include solid-state storage devices that store data in electronic components within the storage device. As mentioned, the storage components 144 may comprise a number of hard disk drives. However, in other embodiments, the storage components 144 may comprise a number of hard disk drives configured in a RAID configuration. The NSM device 108 also includes a configuration map 148, that includes information related to the logical volume(s) or LUN(s) that are stored at the NSM device 108. In cases where the logical volume is distributed over more than one NSM device 108, the configuration map 148 includes information related to the portions of the logical volume stored on the different NSM devices. Furthermore, the configuration map 148 may include information related to other types of LUN configurations, such as, for example, mirroring of the LUN to other storage devices, and snapshots of the LUN.

Figure 4:
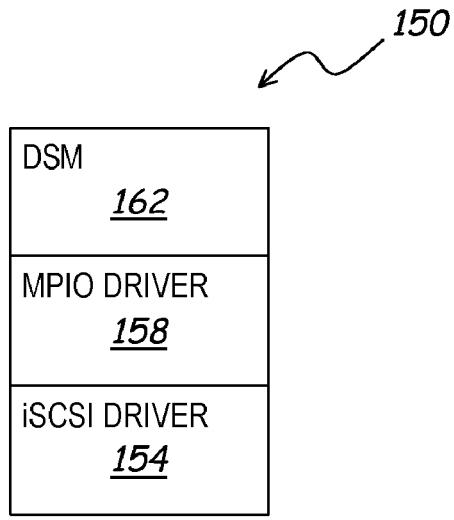
FIG. 4 is a block diagram illustration of a storage driver software stack for an embodiment of the invention.

As is understood, and as described briefly above, iSCSI operates similarly as a regular SCSI device, and therefore each iSCSI target is required to have a unique device identification on the network, as well as a unique path. Also, as mentioned above, a network storage system of the present invention may store a virtual volume of data across several NSMs, with the virtual volume appearing to the host application 120 (FIG. 2) to be a single storage volume with a single I/O address. In one embodiment, in order to provide the host application 120 with a view of the virtual volume, a software stack is used. The software stack of this embodiment is illustrated in FIG. 4. In this embodiment, the software stack 150 is included in the storage drivers 124 portion of the host computer 104 (FIG. 2). The software stack 150 comprises a iSCSI driver 154, a multipath input/output (MPIO) module 158, and a device specific module (DSM) 162. The DSM 162 of this embodiment is used to direct storage the host application's individual disk I/O requests to an appropriate iSCSI target. The iSCSI driver 154 receives the I/O requests from the DSM 162, and formats the request into an iSCSI command. The MPIO module 158 includes of a set of device drivers that is able to manage multiple paths available to a single device to provide a consistent view of the device to the host application 120 (FIG. 2). In one embodiment, the software stack 150 is implemented using Microsoft™ architecture for controlling the destination of any arbitrary disk I/O request. This architecture includes the Microsoft™ Multipath I/O (MPIO) framework, illustrated in FIG. 4 as the MPIO module 158. Support for the specific devices is accomplished through the DSM 162. The DSM 162 in this embodiment is responsible for recognizing and servicing devices that it supports, and directs each disk I/O to an appropriate destination on the network 100. The DSM 162 is also responsible for handling any recoverable errors that occur during disk I/O activity.

In one embodiment, the DSM 162 is kernel mode software that provides the specific functionality within the Microsoft MPIO architecture to support the various devices. It includes a set of defined entry points that are called by the other MPIO driver components during initialization, plug-and-play events, and I/O processing. The DSM 162 is responsible for identifying and claiming devices, maintaining configuration data per LUN, and directing I/O commands to the proper NSM based on that configuration. An iSCSI Initiator refers to any supported software or HBA based iSCSI compliant Initiator entity. For the Microsoft platform this refers to the Microsoft Software Initiator or any Microsoft certified iSCSI HBA. The DSM 162 provides iSCSI services such as login, logout, and discovery to components via, for example, the Microsoft iSCSI API's.

Figure 5:
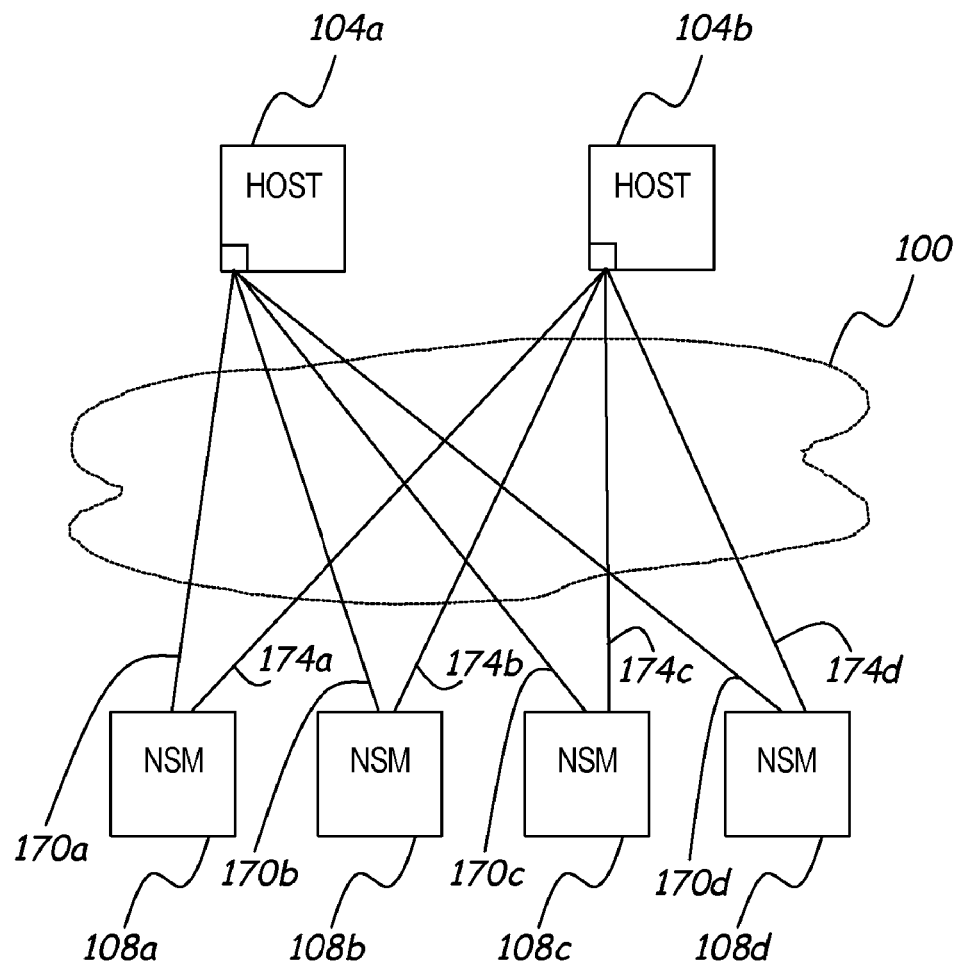
FIG. 5 is a block diagram illustration of a network storage system illustrating multiple paths between host computers and NSMs for an embodiment of the invention.

A block diagram illustration of a storage system of an embodiment is illustrated in FIG. 5. In this embodiment, two host computers 104a, 104b use four NSMs 108a through 108d, for network storage. Each host computer 104a, 104b has a data path to each NSM 108 through the network 100. As illustrated in FIG. 5, host computer 104a communicates with the NSMs 108 through data paths 170a through 170d. Similarly, host computer 104b communicates with the NSMs 108 through data paths 174a through 174d. As will be understood, the illustration of the paths 170, 174, are for purposes of illustration only, and the actual path from a host computer 104 to a NSM 108 may traverse a number of different nodes within the network 100. Furthermore, alternate paths from each host computer 104 to each NSM 108 may also be present. As mentioned above, a host computer 104a may access one or more virtual volumes that span each of the NSMs 108a through 108d. Thus, each of the NSMs 108a-108d store a portion of the data stored within the virtual volume. Furthermore, as also mentioned above, the host application 120 (FIG. 2) is provided a view of the virtual volume such that the virtual volume has a single storage address with respect to the host application 120. In order to provide a view of the virtual storage volume to the host application, the software stack 150 (FIG. 4) provides a view to all of the paths 170a-170d as though they are a single device. Any number of NSM's 108 may be used to create a scalable cluster. To achieve enhanced performance, I/O operations to a LUN are sent directly to the NSM 108 containing the specified data blocks.

Each NSM 108, in an embodiment, provides functionality including SCSI Inquiry Vital Product Data Device ID page 0x83 that provides a unique identifier with association type 0 for each LUN. SCSI Inquiry Vital Product Data Device ID page 0x83 will be described in further detail below. This unique identifier serves as a LUN serial number and is unique across all clusters in all management groups. All NSM's 108 in a cluster return the same identifier for a given LUN. SCSI Inquiry Vital Product Data page 0x83 also provides a unique identifier with association type 1. Each NSM 108 in a cluster returns a unique identifier of this type. The NSM 108 may concatenate various types of information to create this identifier. Each NSM 108, in this embodiment, also provides a vendor-unique Mode Sense/Select pages for volume configuration information; and vendor-unique SCSI Request Sense ASC/ASCQ codes to indicate an invalid LUN configuration. The DSM 162, in an embodiment, uses the Microsoft iSCSI Initiator DDK WMI classes to perform iSCSI tasks such as discovery, login, and logout. An NSM 108 may also provide an iSCSI gateway, providing access to storage over a SAN. Such an embodiment will be described in more detail below.

Figure 6:
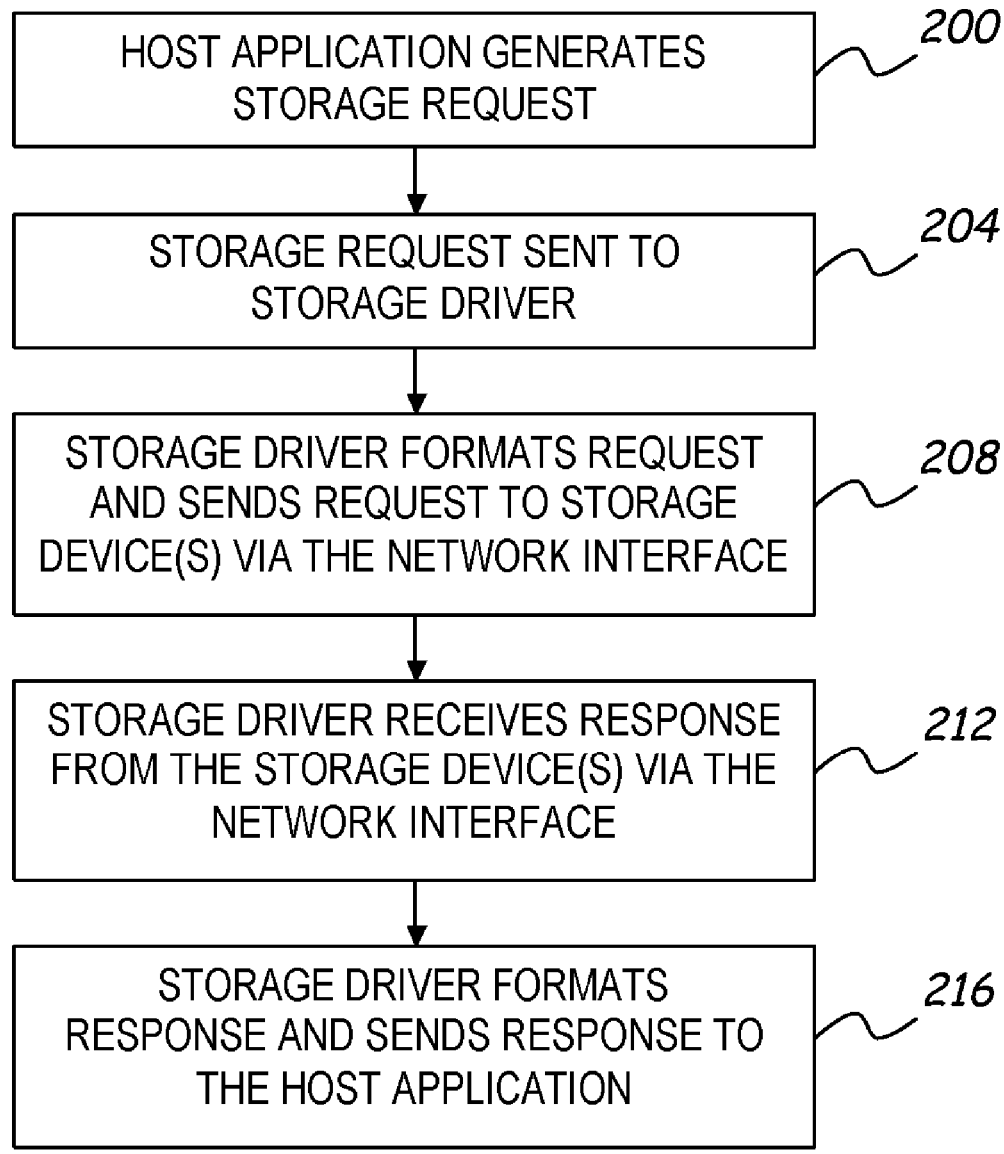
FIG. 6. is a flow chart illustration of the operational steps for a storage request of a host application.

With reference now to the flow chart illustration of FIG. 6, the operational steps for performing a storage operation are described for an embodiment. Initially, as indicated at block 200, the host application generates a storage request. The storage request may be, for example, a request to read certain data stored at the NSMs, or a request to write data to a virtual volume stored across one or more NSMs. The storage request, according to block 204 is sent to the storage driver. The storage driver then formats the request and sends the request to the storage device(s) via the network interface, as noted at block 208. The storage driver may format the storage request to access portions of a virtual storage volume that is stored across one or more of the NSMs, thus providing a request to each of the necessary NSM's having relevant portions of the virtual storage volume that are necessary for completing the storage request. The process by which the storage driver processes, formats, and sends the request(s) will be described in more detail below. At block 212, the storage driver receives a response from the storage device(s) via the network interface. Finally, at block 216, the storage driver formats the response and sends the response to the host application. In the embodiment where the request is directed to a virtual storage volume stored across two or more NSMs, the storage driver receives the necessary responses from the NSMs, and combines the responses to a single response to the storage request received from the host application.

In order that the storage driver is able to determine the location and format the storage request in the proper manner, the storage driver must have some knowledge of NSMs that are attached to the network and the portions of one or more logical volumes that are stored on the NSMs. In one embodiment, the storage drivers obtain LUN metadata that includes this information. In this embodiment, a virtual volume is defined as a LUN within the storage network. The LUN has metadata associated therewith that includes information such as the NSMs that store portions of the volume, as well as what portions of the volume are stored at the NSMs. For example, a LUN may have a number of logical block addresses (LBAs), with a first portion of the LBAs stored at a first NSM and a second portion of the LBAs stored at a second NSM. The LUN metadata includes this information. In one embodiment, a user configures a first connection, and the system determines other connections, addresses, and paths for the additional connections. This process is referred to herein as bootstrapping, and may use various discovery mechanisms in order to bootstrap multi-path support. A manual bootstrap may be performed, where a user enters the iSCSI Target Portal name or IP address and activates iSCSI Target login. An automated bootstrap may also be used that provides an automated discovery of connections. In one embodiment, an automated bootstrap is utilized that leverages iSNS and DHCP. In this embodiment, iSCSI targets (NSMs) register with iSNS and the host computer uses iSNS to discover iSCSI targets made available. The storage client will login to a target to begin its bootstrap process. One embodiment uses the Microsoft™ iSCSI Initiator architecture along with the Microsoft™ Multipath I/O architecture to provide multi-path disk I/O capabilities for disk devices provided by the iSCSI target. Control operations (i.e., SCSI reserve/release, iSCSI login parameters) are managed as needed in order to maintain the behavior of normal iSCSI connections to applications. The DSM 162 within the storage drivers, in this embodiment, interoperates with all Microsoft™ HCT certified hardware and software initiators. Furthermore, the wire protocol for iSCSI connections adhere to the iSCSI standard. In other words, each of the iSCSI connections appear to be a valid iSCSI data transport. The present invention thus does not modify iSCSI initiator behavior. Furthermore, the application client 104 is not normally able to differentiate (without specifically checking server configuration data) between normal iSCSI and multipath iSCSI connections.

In one embodiment, the DSM application is capable of executing and performing configuration changes with limited user involvement. In this embodiment, there is little or no user-visible component, little or no required configuration, and little or no ongoing monitoring or maintenance for this feature beyond installation. The DSM provides for a configuration that requires minimal user involvement at the host executing the iSCSI initiator. In this embodiment, the DSM uses the Microsoft iSNS server. The iSNS server provides capability for discovery and the use of the DHCP option for locating the iSNS server providing discovery services for a given zone or cluster. The only changes required by a user are changes to the DHCP server configuration. Following the changes to the DHCP server configuration, the iSNS server discovers the change, and updates the configuration within the DSM, and thus the host application executing the iSCSI initiator is not required to be updated by a user.

In another embodiment, the MPIO architecture that is utilized supports up to 32 paths to a device. For example, one version of the Microsoft MPIO driver supports a maximum of 32 paths to a device. In this embodiment, the multipath iSCSI DSM supports client access to at least 16 clustered LUNs stored on a total of 16 NSMs concurrently. However, it will be understood that the number of NSMs or LUNs supported may be any number greater or less than the above example. The total number of paths may be limited by the operating system limitation of paths to a device, such as Microsoft's 32 path limit. However embodiments of the invention will still operate correctly when the actual number of paths exceeds that limit. In one embodiment, if the iSCSI initiator or host application limits the number of iSCSI connections that can be made to NSMs, the multipath iSCSI DSM may still operate correctly, with the potential to revert to a connection to a single NSM gateway. In this case, an iSCSI connection is established with one NSM, and I/O operations are forwarded to that single NSM, which then forwards any I/O operations to other NSMs as required.

Figure 7:
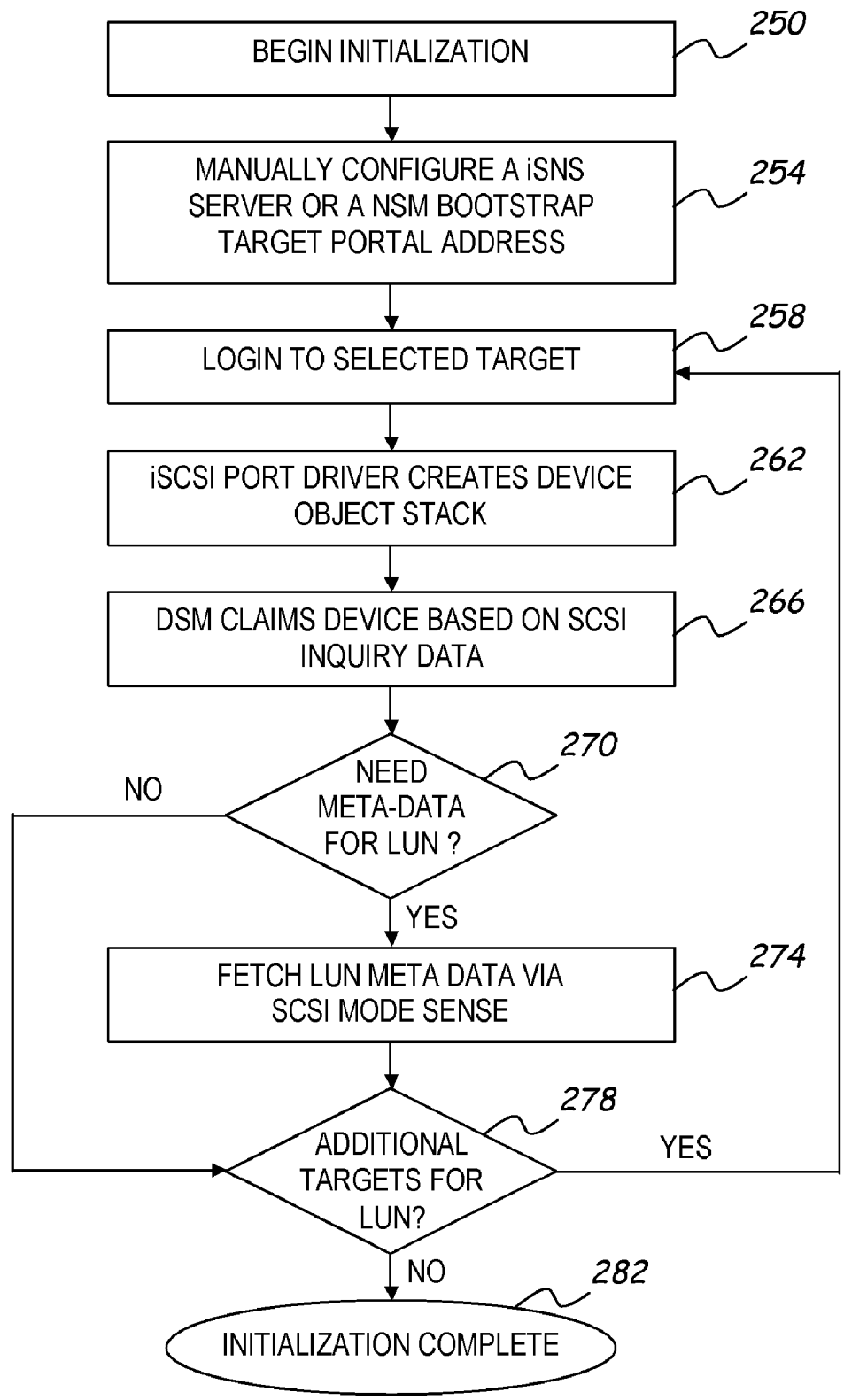
FIG. 7 is a flow chart illustration of the operational steps for initializing a DSM for an embodiment of the invention.

Referring now to the flow chart illustration of FIG. 7, the operational steps for initializing a host computer for one embodiment of the present invention are described. Initially, at block 250, the initialization begins. At block 254, a user manually configures a iSNS server or a NSM bootstrap target portal address. This manual configuration may be performed through a user interface associated with the host computer. If user configuration of an iSCSI target is required, such an interface may be implemented, for example, as an additional tab to the Microsoft™ iSCSI Initiator Properties dialogue. In other embodiments, such as, for example, if a HBA is used in the network interface, a Properties dialog may be included under the Network Storage Devices container in the Device Manager. At block 258, the DSM initiates a login to a selected target. Such a login is a standard login by an initiator (e.g. the host computer) into an iSCSI target (e.g. a NSM). At block 262, a iSCSI port driver, within the storage drivers, creates a device object stack. Following the creation of the device object stack, the DSM claims the device based on SCSI inquiry data, as indicated at block 266. At block 270, it is determined if metadata is needed for the LUN. If metadata is needed, the metadata is obtained, in one embodiment, using a SCSI mode sense command. In other embodiments, the host computer and NSM may have a separate communication path over which such changes are communicated. The operations associated with obtaining metadata is described in more detail below. Following the obtaining of the LUN metadata, or following the determination that LUN metadata is not needed at block 270, it is determined if there are additional targets for the LUN that have not been logged into, according to block 278. If it is determined that there are more targets, the operations beginning at block 258 are repeated. If no additional targets are required to be logged into at block 278, the initialization is complete, as indicated at block 282.

The DSM may also support CHAP. In such a case, a user is required to configure CHAP information and log in to a volume on one path. The DSM will perform the additional logins to the volume on other paths, assuming the CHAP secret is the same for that volume on all paths. The approach is also applicable to other storage networking transports, such as FC and Infiniband. Furthermore, the invention also supports 64-bit architectures, and is equally applicable to other architectures.

As described above with respect to block 254, initialization in this embodiment requires the manual creation of at least one iSCSI target session to a volume or LUN. The iSCSI targets may be discovered using iSNS or via a iSCSI SendTargets request to a manually configured NSM target IP address. As mentioned, the initial discovery and login can be done using the Microsoft Initiator control panel. In this embodiment, this provides the information needed to bootstrap the DSM, allowing it to retrieve configuration information for each LUN and create additional target sessions as necessary. In addition, if the NSM's are configured to require CHAP authentication, configuration of target CHAP secrets may be done once by the user. The DSM, in this embodiment, will assume that CHAP information is the same for a volume on all paths.

Additional detail of the DSM operation is now provided for one embodiment. In this embodiment, after an initial login session is established, the iSCSI Initiator port driver creates a new device object associated with the LUN. The DSM entry point DsmInquireDriver( ) is eventually called by the MPIO driver to allow the DSM to claim the device. The DSM uses SCSI Inquiry Vendor and Product Identifiers to decide whether or not to claim this device. If the DSM claims the device, and does not have current configuration data yet for this LUN, the DSM will issue a SCSI Mode Sense request for vendor-unique page 0x20 to the device. The vendor-unique page 0x20 will be described in more detail below. The issuance of the SCSI Mode Sense request may be done asynchronously so as not to hold up MPIO processing of DsmInquireDriver( ). When the Mode Sense page is received, the DSM thread that is waiting for it will examine the volume configuration page and issue any additional login requests necessary to all remaining NSM targets associated with this LUN. Such login requests will cause a reiteration of DsmInquireDriver( ) calls where the DSM will claim these new devices. The DSM thread will then issue a Mode Select containing it's current configuration page 0x20down every path to this LUN. This page contains the configuration version number (logical time) to inform each NSM which version of the LUN metadata is being used.

If the DSM claims the device, and has already claimed one or more devices, MPIO calls the DSM entry point DsmCompareDevices( ) to allow the association of multiple paths with a single device. In that function the DSM uses SCSI Inquiry Vital Product Data page 0x83 identifiers to determine if two device paths represent the same underlying volume or LUN. The SCSI Vital Product Data page 0x83 will be described in more detail below. A unique page 0x83 identifier (of Association type 0) is provided for each LUN. This identifier acts as a LUN serial number and is unique across all clusters and management groups, and all NSMs in a cluster return the same identifier for a given LUN.

To allow for the latency of issuing the Mode Sense/Select requests, creating new iSCSI sessions, and building up new device stacks during reconfigurations, certain configurable MPIO parameters may be set to appropriate values to provide adequate time for these operations to complete. In particular, the retry count and the interval between retries may be set sufficiently high to prevent the exhausting of retries and applications experiencing I/O errors. These parameters may configurable and be set during DSM initialization to sufficient values. Furthermore, if it is determined that the values are not sufficient to allow for routine changes, they may be modified as necessary.

Figure 8:
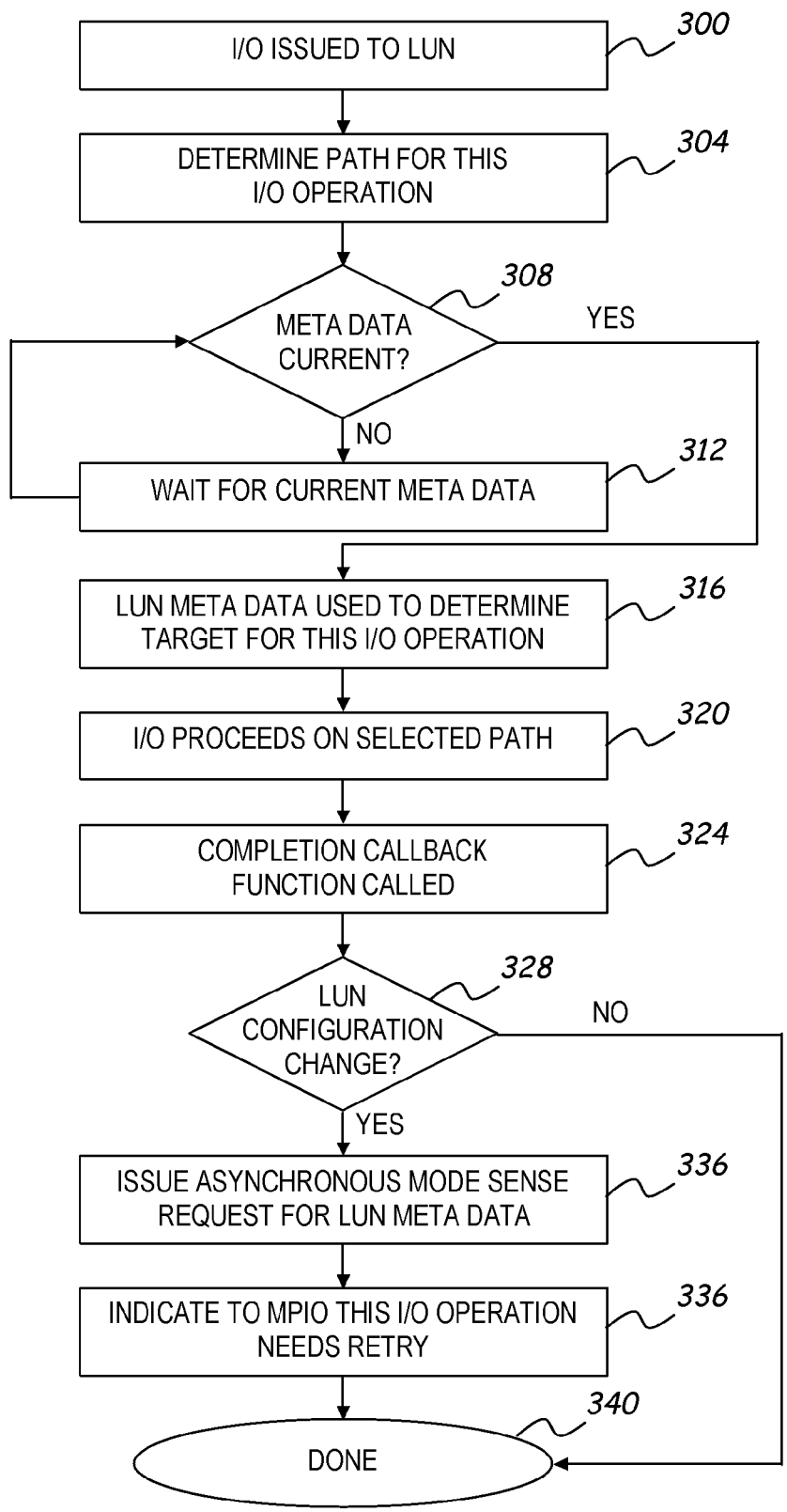
FIG. 8 is a flow chart illustration of the operational steps for issuing an I/O from a DSM for an embodiment of the invention.

Referring now to the flow chart illustration of FIG. 8, the operational steps for storage operations are described for an embodiment of the present invention. Initially, at block 300, a storage I/O is issued to a LUN. The storage I/O may be initiated by a host application operating on a host computer, for example. The host application, in this embodiment, makes a storage I/O request to what is seen, from the application's perspective, a single volume of data stored on a data storage device. As described above, the data may physically be stored on a virtual volume of data that is distributed across a number of NSMs. At block 304, the path for the I/O operation is determined. The operations for determining the path are preformed by the DSM operating within the storage drivers of the host computer. The DSM accesses the LUN metadata to determine a configuration map of data within the virtual volume, and determines the appropriate data path for the I/O operation based on the configuration map. At block 308, it is determined if the metadata for the LUN is current. This determination is made, in an embodiment, by determining if an I/O error has been received in response to any previous I/O operations indicating a configuration change that has not yet been implemented. If the metadata is not current, the DSM waits for the current metadata, as noted at block 312. If the metadata is current at block 308, the LUN metadata is used to determine the target for the I/O operation. As mentioned above, the target is determined as the NSM having the portion of the virtual volume that is needed for completion of the storage request. At block 320, the I/O proceeds along the selected path.

At block 324, the iSCSI driver receives a completion callback function. A completion callback, as is known in the art, is a response that is passed to the initiator asynchronously and contains an error/success code related to the I/O operation that was previously sent. The completion callback, in one embodiment, contains one or more error codes that may be processed by the host computer to determine if any changes have been made in the LUN, or if there were any errors in the completion of the I/O operation. At block 328, it is determined if there was a LUN configuration change. If the NSM determines that the LUN configuration has not been changed the I/O operation is processed at the NSM device. In one embodiment, the NSM that received the I/O operation determines if the LUN configuration has been changed. A LUN configuration change may be communicated to an NSM in one of a number of ways, including the issuance of a mode sense command, a forced termination of the iSCSI connection to the NSM, encoded information in task identification information, and through a separate communication channel between the initiator and NSM, to name a few. NSMs, in an embodiment, communicate between each other to propagate configuration changes, and perform other storage functions such as mirroring, snapshot copying, and backup operations. A configuration change may occur, for example, because a user has manually changed the configuration for a LUN, or if there is a failure that prevents access to data stored on an NSM. In one embodiment, a mode sense command is used to communicate LUN configuration changes. When an NSM receives a mode sense command, the NSM returns a mode sense response to the DSM including the LUN configuration of the NSM. In one embodiment, this information also includes a logical time stamp that indicates the time of the latest LUN metadata change for the device issuing the mode sense response. The logical time stamp may be compared to the logical time stamp associated with the latest LUN metadata. If, for example, the host computer issues a mode sense command, and receives a mode sense response with the same logical time stamp, this indicates that no changes to the LUN metadata have occurred at either the host computer or the NSM device(s) returning the mode sense response. If the logical time stamps are not the same, this indicates that the LUN metadata has changed either on the host computer (or other device issuing the mode sense command), or on the NSM device. In one embodiment, the logical time stamps are compared to see which has a later time, thus indicating that the LUN metadata associated with the device having the later time is the most up to date. However, it will be understood that numerous other mechanisms may be used to determine if a configuration change has occurred, as well as for determining which device has the most up to date configuration change. The comparisons, error codes, and responses to errors will be described in more detail below.

If it is determined at block 328 that there is a LUN configuration change, the host computer issues an asynchronous mode sense request for LUN metadata from the NSM device that reported the LUN configuration change. This request for updated information will be described in more detail below. The host computer then generates an indication that the I/O operation needs a re-try, as indicated at block 336. Following block 336, or when it is determined at block 328 that there is not an LUN configuration change, the I/O operation is complete, as indicated at block 340.

As mentioned above, the DSM may determine if a configuration change has occurred. In one embodiment, in order to maintain a ready state for each managed LUN, the DSM has a mechanism to fetch LUN configuration information and a mechanism to detect when the information is no longer current. To fetch configuration information for a LUN the DSM issues a SCSI Mode Sense command with vendor unique page 0x20. To detect when the information is no longer current the DSM examines the completion status of I/O operations to the LUN. If the DSM encounters a SCSI Status with CHECK CONDITION and SCSI Sense Key 0x9 with SCSI ASC 0x04 and SCSI ASCQ 0x02 it will issue the Mode Sense command to fetch the new configuration page and enter a state for that LUN in which further I/O will be held off or re-tried until the configuration information is successfully updated. To ensure volume data coherency, the DSM will also issue this Mode Sense when it detects and loss of connection related error to make sure it is using the current configuration.

Furthermore, in an embodiment, after successfully receiving this Mode page containing a new configuration version, the DSM will inform all the NSM's in the cluster which version it is using by issuing a Mode Select containing the current configuration page 0x20 to all paths for the volume.

In one embodiment, the system uses the following vendor unique volume configuration SCSI mode sense page:

| Byte | Bit | 7 | 6 | 5 | 4 | 3 | 2 | 1 | 0 |
|---|---|---|---|---|---|---|---|---|---|
| 0 | PS | SPF | Page Code (20 h) | | | | | | |
| 1 | Sub-Page Code | | | | | | | | |
| 2 | Page Length (n–3) | | | | | | | | |
| 3 | | | | | | | | | |
| 4 | Reserved | MP Enabled | | | | | | | |
| 5 | Vendor ID | | | | | | | | |
| 12 | | | | | | | | | |
| 13 | Product ID | | | | | | | | |
| 16 | | | | | | | | | |
| 17 | Revision | | | | | | | | |
| 20 | | | | | | | | | |
| 21 | Volume Configuration version (ltime) | | | | | | | | |
| 28 | | | | | | | | | |
| 29 | Volume Page Size | | | | | | | | |
| 36 | | | | | | | | | |
| 37 | Number of Replicas | | | | | | | | |
| 40 | | | | | | | | | |
| 41 | iSCSI Target Name | | | | | | | | |
| 264 | | | | | | | | | |
| 265 | Number of Regions | | | | | | | | |
| 268 | | | | | | | | | |
| 269 | Region Descriptor (first) | | | | | | | | |
|   | ... | | | | | | | | |
|   | Region Descriptor (last) | | | | | | | | |
| n | | | | | | | | | |
| 0 | PS | SPF | Page Code (20 h) | | | | | | |
| 1 | Sub-Page Code | | | | | | | | |
| 2 | Page Length (n–3) | | | | | | | | |
| 3 | | | | | | | | | |
| 4 | Reserved | MP Enabled | | | | | | | |
| 5 | Vendor ID | | | | | | | | |
| 12 | | | | | | | | | |
| 13 | Product ID | | | | | | | | |
| 16 | | | | | | | | | |
| 17 | Revision | | | | | | | | |
| 20 | | | | | | | | | |
| 21 | Volume Configuration version (ltime) | | | | | | | | |
| 28 | | | | | | | | | |
| 29 | Volume Page Size | | | | | | | | |
| 36 | | | | | | | | | |
| 37 | Number of Replicas | | | | | | | | |
| 40 | | | | | | | | | |
| 41 | iSCSI Target Name | | | | | | | | |
| 264 | | | | | | | | | |
| 265 | Number of Regions | | | | | | | | |
| 268 | | | | | | | | | |
| 269 | Region Descriptor (first) | | | | | | | | |
|   | Region Descriptor (last) | | | | | | | | |
| n | | | | | | | | | |

The SPF Sub-Page Format bit is defined in the T10 SPC-3 specification. It allows page lengths of up to 65535 bytes with the addition of a second Page Length byte. In this embodiment, due to the amount of information contained in this page, the SPF bit is set. The Sub-Page Code is set to zero. The MP Enabled bit, if set, indicates this LUN can be used with Multi-path I/O. The 8 byte Vendor ID contains the vendor name (e.g. "LEFTHAND") in ASCII format and padded with spaces at the end. The 4 byte Product ID contains the product name (e.g. "mpio") in ASCII format and padded with spaces at the end. The 4 byte Revision contains the revision number of this product in ASCII format and padded with spaces at the end. The 8 byte Volume Configuration Version number is the configuration logical time value, or some other value indicating the version of this configuration information. The Volume Page Size is given in bytes, and is the fixed number of contiguous bytes allocated to one disk before volume data is allocated to another disk. The Number of Replicas is the replication level of the volume. The 224 byte iSCSI Target Name field contains the iSCSI qualified name for this LUN and must be the same as reported by all NSM's in a cluster. The Target Name is in ASCII format terminated with a NULL (zero) byte. The Number of Regions field contains the quantity of NSM's in the cluster. This value specifies the number of Region Descriptors that follow.

The remainder of the page contains a list of Region Descriptors used to uniquely identify all NSM paths to the LUN. It is assumed that the ordering of the regions in the list is important for determining which path to send I/O for a given block range. The Region Descriptor, in an embodiment, is as follows:

| Byte | Bit | 7 | 6 | 5 | 4 | 3 | 2 | 1 | 0 |
|---|---|---|---|---|---|---|---|---|---|
| 0 | Reserved | | | | | | | Status | |
| 1 | Path Identifier Length | | | | | | | | |
| 2 | Path Identifier | | | | | | | | |
| 33 | | | | | | | | | |
| 34 | Number of Portals | | | | | | | | |
| 35 | Portal Descriptor (first) | | | | | | | | |
| 42 | | | | | | | | | |
|   | Portal Descriptor (last) | | | | | | | | |
| n | | | | | | | | | |

One or more Region descriptors may be included in the Volume Configuration Mode Sense page to provide path information for every NSM participating in a volume (LUN).

The Status bit, if set, indicates this region is currently active. If not set, the DSM will not attempt to use this region for I/O. The Path Identifier Length is the actual number of bytes of Path Identifier information contained in the Path Identifier field that follows. The Path Identifier is the SCSI Inquiry Vital Product Data page 0x83 identifier for this region with an association value of 1. This field is a fixed length of 32 bytes. It can be either a binary or ASCII value. The actual length used is indicated in the Path Identifier Length field above. This identifier is associated with a particular NSM and is unique across all NSM's in a cluster. To allow the DSM to map particular NSM paths to MPIO paths, this same identifier is returned by the NSM in the Inquiry page 0x83 identifier with an association value of 1. The description of the Inquiry Device Identification page 0x83 is contained in the T10 SPC-2 specification. The Number of Portals field indicates how many Portal Descriptors follow. The remainder of the Region Descriptor contains a list of Portal Descriptors describing each network portal address available for this region (NSM). The Portal Descriptors may be ordered with the preferred portal (e.g. highest performance) first in the list. Portal Descriptors, in one embodiment, are defined as follows:

| Byte | Bit 7 | 6 | 5 | 4 | 3 | 2 | 1 | 0 |
|---|---|---|---|---|---|---|---|---|
| 0<br>3 | iSCSI Target Portal Address | | | | | | | |
| 4<br>5 | iSCSI Target Portal Port | | | | | | | |
| 6<br>7 | iSCSI Target Portal Group Tag | | | | | | | |

One or more Portal Descriptors are included in each Region Descriptor to describe all of the available iSCSI Portals for that region. The iSCSI Portal Address is the IP address (expressed as a 32 bit integer in network byte order) at which this iSCSI target can be reached. The Portal Port is the TCP port number of the portal expressed as a 16 bit value in network byte order. The iSCSI Target Portal Group Tag identifies a portal group within the iSCSI node. It is also a 16 bit value in network byte order.

The operation of the DSM for one embodiment is now described in more detail. The MPIO data path begins with an I/O request to a LUN. The entry point DsmLBGetPath( ) is called by the MPIO disk class replacement driver. If the volume configuration data is not current, and has not already been requested, the DSM will issue the Mode Sense command to the device. The DsmLBGetPath( ) processing will have to block until the Mode Sense page is received in order for it to choose among valid paths.

After DsmLBGetPath( ) has returned a selected path for the I/O, the DSM is not called again until its registered completion callback function is called, or the entry point DsmInterpretError( ) is called in the case of failure. In that function the DSM will examine the SCSI completion status for the request. If the request completed with a SCSI Check condition the DSM will further examine the SCSI Request Sense information. If the Sense Key is 0x9, and the Additional Sense Code (ASC) is 0x04, and the Additional Sense Code Qualifier (ASCQ) is 0x02, this indicates that the LUN configuration is invalid. In that case the DSM will asynchronously issue a Mode Sense request for the new configuration. The DSM will then set the state of this LUN to CONFIGURATION_PENDING and indicate to MPIO that a retry is necessary for this request. When the new configuration information is received, the DSM will issue the Volume Configuration Mode Select page to all NSM's to inform them of the configuration version now being used. Further I/O received for this LUN while in the CONFIGURATION_PENDING state are either be held off or handled with retries as discussed above.

As will be understood, data corruption may result if I/O operations are performed on different volume or LUN partitions while a cluster change is occurring. The DSM, in an embodiment, prevents this by taking the following actions when it receives an error status. Such an error status may include the examples described above, as well as any error related to possible loss of connection with the target. When an error status is received, the DSM enters a state for the LUN where all errors are retried on their original path and all new requests are blocked. The DSM issues the Volume Configuration Mode Sense request. If Mode Sense fails, it is tried on a different path. Any path on which the Mode Sense fails (after retries) will result in removing that path from any further I/O. If the Mode Sense fails after retries on all paths, then the DSM unblocks held requests and designates all further errors as fatal to MPIO. If volume configuration has not changed, then the DSM unblocks held requests and returns to normal state. If volume configuration has changed, the DSM then waits for all outstanding requests for this LUN to complete while still blocking new requests. The DSM then performs iSCSI logouts for all connections to gateways that are no longer in the cluster, and issues iSCSI logins to all new gateways in the cluster. The DSM then issues the Volume Configuration Mode Select page 0x20 to all gateways in the cluster, informing them of the current configuration version. Any path on which this Mode Select fails (after retries) will result in removing that path from any further I/O. After configuration is in synch between the DSM and all paths, then held requests are unblocked and the DSM returns to a normal state. Another potential source of data corruption could result from allowing I/O operations to the same or overlapped blocks on the LUN to be sent on different paths. The DSM, in an embodiment, prevents this by blocking I/O requests until all conflicting requests on other paths are completed.

Figure 9:
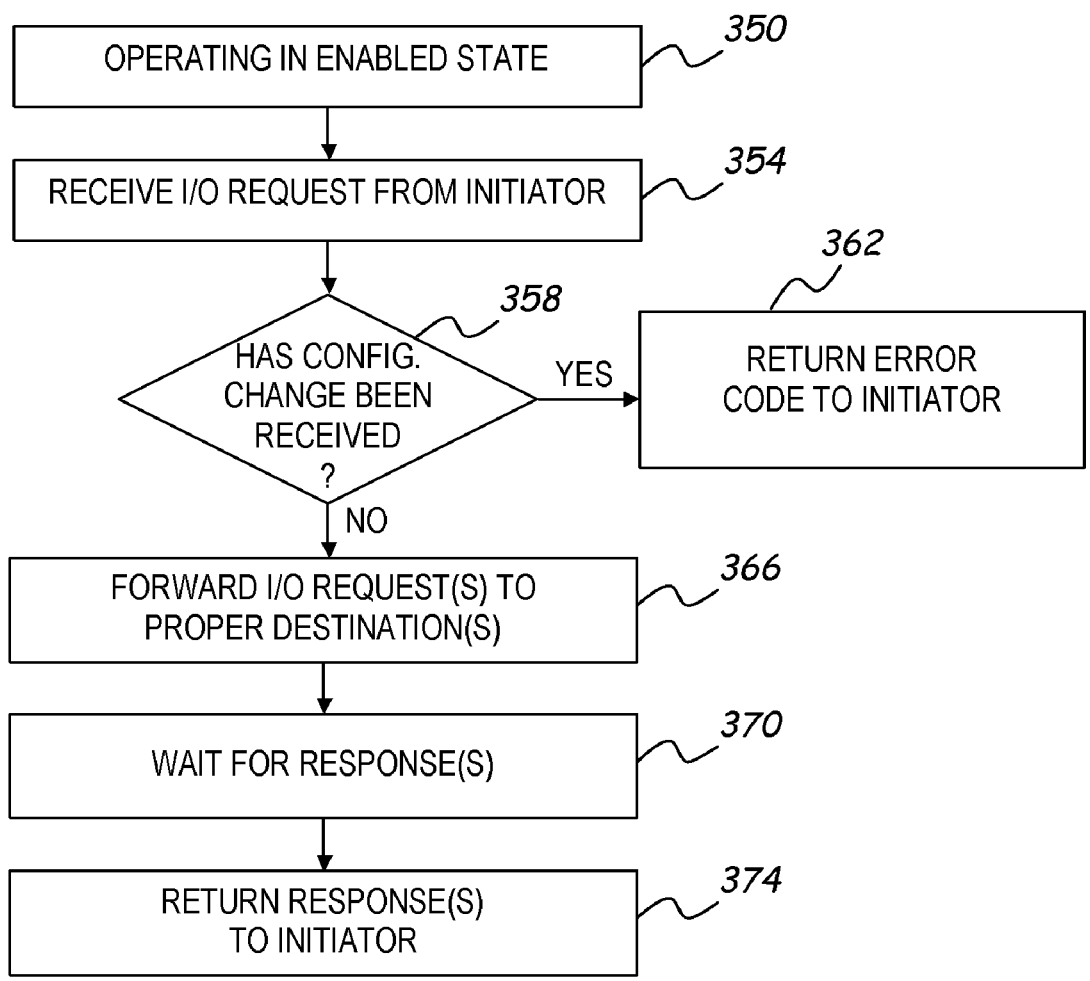
FIG. 9 is a flow chart illustration of the operational steps for receiving and processing an I/O request at an NSM for an embodiment of the invention.

With reference now to the flow chart illustration of FIG. 9, the operational steps for processing an I/O request for an NSM are now described. In this embodiment, initially, as indicated at block 350, the NSM is operating in an enabled state. Each NSM, in this embodiment, includes a flag that is set by a DSM when it is verified that the NSMs are ready to receive iSCSI commands for data storage operations on the virtual volume. The DSM sets this flag when a mode sense command is received from each NSM indicating the same configuration. When the flag is set, the NSM is operating in an enabled state. In one embodiment, the flag is the MP enabled bit as described above with respect to the vendor unique volume configuration SCSI mode sense page. At block 354, the NSM device receives an I/O request from a host computer. At block 358, it is determined if a configuration change command has been received. If it is determined that a configuration change has been received, an error code is returned to the initiator of the I/O request, as indicated at block 362. If it is determined at block 358 that there is no configuration change, the NSM forwards the I/O request to the proper destination location, as indicated at block 366. The proper destination is determined according to the address within the virtual volume indicated in the I/O request and the configuration map. The proper destination may be a storage device that is local to the NSM, or another NSM that contains the portion of the logical volume that is indicated by the I/O request. At block 370, the NSM waits for responses indicating the storage operation is complete. At block 374, the NSM returns the appropriate completion response to the initiator in a callback function.

Figure 10:
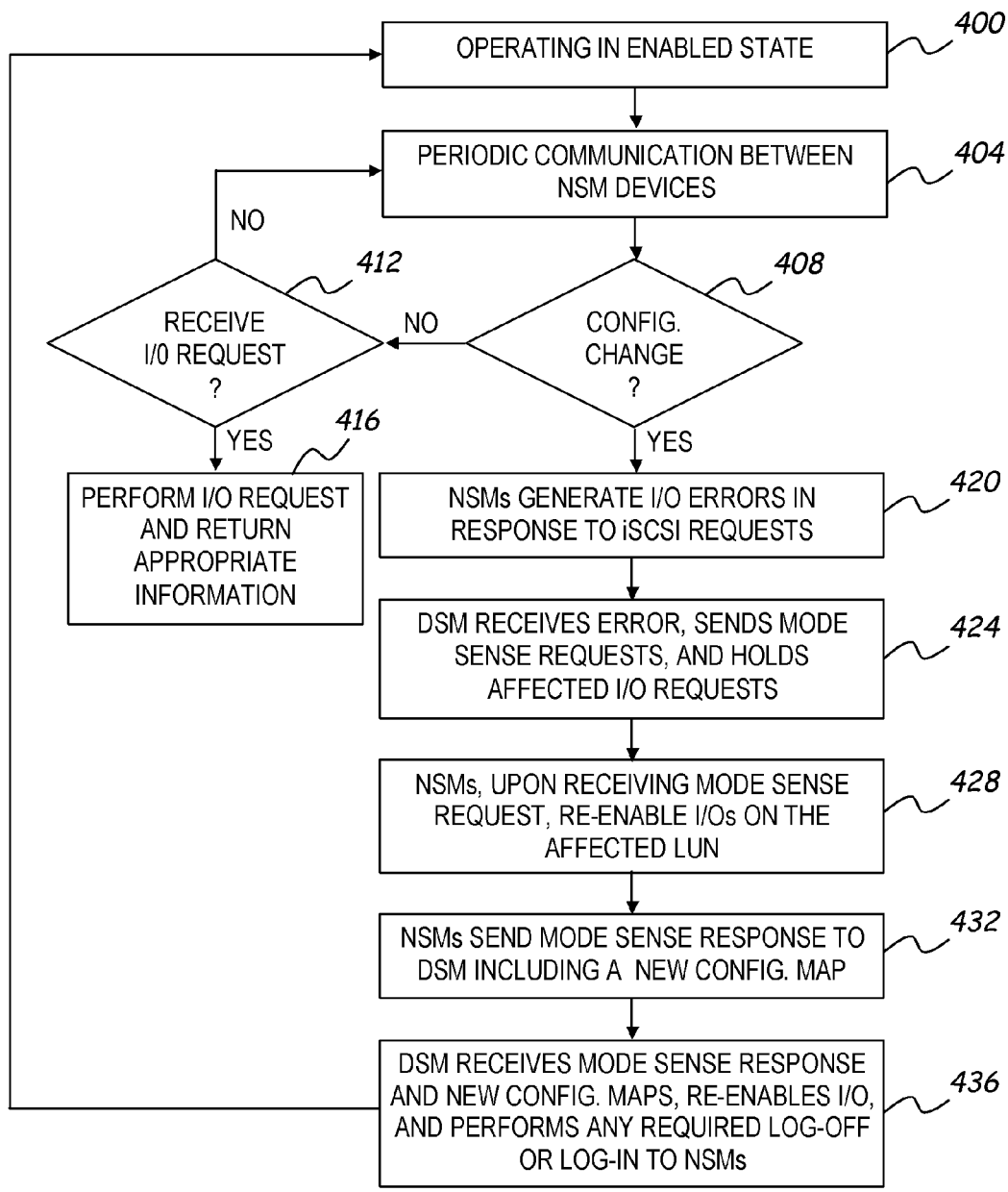
FIG. 10 is a flow chart illustration of the operational steps of one or more DSMs accessing one or more logical volumes stored across several NSMs for an embodiment of the invention.

With reference now to FIG. 10, the operational steps of one or more DSMs accessing one or more logical volumes stored across several NSMs is now described for an embodiment. Initially, the NSMs are operating in an enabled state, as indicated at block 400. In this enabled state, the NSMs communicate amongst themselves by periodically pinging (also referred to as heartbeating) other NSMs that share LUNs, as indicated at block 404. This communication may be performed using any appropriate network protocol. Through this communication, the NSMs determine when a configuration change has occurred, noted by block 408. A configuration change may occur, for example, due to a failure that prevents access to data stored on a particular NSM. If a configuration change indication has not been received it is determined if an I/O request has been received, as noted by block 412. If such a request has been received, the NSM performs the I/O request and returns the appropriate information, as noted at block 416. If an I/O request is not received at block 412, the operations starting at block 404 are repeated. If, at block 408, it is determined that there is a configuration change, each NSM that learns of the configuration change begins generating I/O errors on received iSCSI requests, as indicated at block 420. In such a case, the configuration map for any affected LUNs is to be changed. When this decision is made, it is propagated amongst the NSMs, along with a new configuration map. At block 424, a DSM receives one or more I/O errors it sends a mode sense request to the NSMs to obtain a new configuration map, and holds any affected I/O requests. The NSMs, upon receiving the mode sense request, reenable I/Os on the affected LUN, as indicated at block 428. Reenabling I/O requests allows I/Os to be processed instead of causing immediate error responses. At block 432, the NSMs send a mode sense response to the DSM, including a new configuration map. The new configuration map will also have an associated value, such as a logical time stamp, to uniquely identify the configuration map. At block 436, the DSM received the mode sense response and new configuration maps, reeanbles I/O to the affected LUN(s), and performs any required log off and/or log in to appropriate NSM(s). The operations continue beginning with block 400.

While the operations described with respect to FIGS. 8-10 illustrate that the configuration changes are communicated between devices using various iSCSI commands, it will be appreciated that other communication may also be used to communicate such changes. For example, the NSMs and host(s) may have a separate communication path that is used to propagate configuration changes throughout the system. In this embodiment, I/O requests such as requests to read and write data, are communicated using iSCSI between the various devices, and configuration changes, and/or heartbeating is performed using the separate connection. Such a separate connection may also be established using the same network as used for iSCSI commands, with a separate port on each device used for the additional communication path.

Using systems described above in a storage network provides several features. One such feature is enhanced data consistency under many potentially adverse conditions, including following individually and in conjunction: NSM failure, server failure, Microsoft Clustering Services failover, LUN length change, and network partition. Furthermore, the multipath iSCSI DSM may accommodate other common failure scenarios in a SAN, such as, for example, an NSM failure. To prevent out-of-order operations the DSM blocks any request while there is another request outstanding to the same (or overlapped) logical block range on the LUN. When the outstanding request is completed, or an error is returned indicating a configuration change or failure, the DSM takes appropriate action to either obtain a correct configuration, perform error recovery, or send the next request. In a similar manner, the multipath iSCSI DSM may also support volume (LUN) expansion. In other embodiments, the NSMs support volume replication, volume snapshots, and remote copy snapshots (in terms of support for volumes that have snapshots, and also mounting and accessing snapshots directly).

Various user features are also present in embodiments, including a command-line interface providing any capability provided via a GUI. In the embodiment described above, only the Microsoft iSCSI Initiator Control Panel is required for configuration. A graphical user interface may include a Control Panel Application for managing the configuration of MPIO and monitoring the multi-path environment. The application may also include troubleshooting and debug support for field engineers and support personnel for assistance in resolving problems on customer premises. A user interface may also be provided for viewing and changing the MPIO subsystem configuration. Software Installation and Upgrade may be installed, for example, using the Microsoft Windows Installer.

While the invention has been particularly shown and described with reference to embodiments thereof, it will be understood by those skilled in the art that various other changes in the form and details may be made without departing from the spirit and scope of the invention.

What is claimed is:

1. A data storage server system, comprising:
   at least first and second data storage servers; and
   at least one virtual volume of data storage distributed over at least said at least first and second data storage servers;
   wherein each of said at least first and second data storage servers comprise:
   a configuration map comprising information related to said at least one virtual volume and portions of said at least one virtual volume stored at each of said at least first and second data storage servers;
   a network interface operable to transmit/receive communications to/from a network infrastructure;
   at least one data storage device; and
   a processor operable to receive, from said network interface, an iSCSI network command from a host computer indicating a change in said configuration map and generate an error code when additional iSCSI commands are received requesting data storage operations before a new configuration map is received, and further operable to receive an iSCSI network command and generate, to carry out said iSCSI network command, one or more device specific commands for said data storage device without communicating with any other data storage server when an indication of a change in said configuration map has not been received.

2. The data storage server system, as claimed in claim 1, wherein said configuration map further comprises a data storage configuration identifier indicative of an allocation of data storage within said storage server system at a point in time.

3. The data storage server system, as claimed in claim 2, wherein said data storage servers are further operable to generate an iSCSI mode sense page including said data storage configuration identifier in response to an iSCSI mode sense command.

4. The data storage server system, as claimed in claim 1, wherein said error code comprises an iSCSI status comprising a SCSI sense key comprising a predetermined code.

5. The data storage server system, as claimed in claim 1, wherein said configuration map further comprises volume replication information indicating that said virtual volume is to be copied to at least a third and a fourth data storage server.

6. The data storage server system, as claimed in claim 1, wherein each of said data storage servers are further operable to forward read and write commands to an appropriate other data storage server when the iSCSI command incorrectly requests data from said other data storage server.

* * * * *

UNITED STATES PATENT AND TRADEMARK OFFICE
CERTIFICATE OF CORRECTION

| | |
|---|---|
| PATENT NO. | : 7,529,816 B2 |
| APPLICATION NO. | : 10/908993 |
| DATED | : May 5, 2009 |
| INVENTOR(S) | : Mark G. Hayden et al. |

Page 1 of 1

It is certified that error appears in the above-identified patent and that said Letters Patent is hereby corrected as shown below:

In column 13, line 27, delete "and" and insert -- any --, therefor.

Signed and Sealed this

Third Day of November, 2009

David J. Kappos
*Director of the United States Patent and Trademark Office*